US012413659B2

(12) United States Patent  
Pedersen

(10) Patent No.: US 12,413,659 B2  
(45) Date of Patent: Sep. 9, 2025

(54) COMMUNICATION SYSTEM WITH ACCESSORY DEVICE CONFIGURATION

(71) Applicant: FalCom A/S, Ballerup (DK)

(72) Inventor: Søren Christian Voigt Pedersen, Valby (DK)

(73) Assignee: FalCom A/S, Ballerup (DK)

( * ) Notice: Subject to any disclaimer, the term of this patent is extended or adjusted under 35 U.S.C. 154(b) by 0 days.

(21) Appl. No.: 17/525,816

(22) Filed: Nov. 12, 2021

(65) Prior Publication Data

US 2022/0166870 A1    May 26, 2022

(30) Foreign Application Priority Data

Nov. 24, 2020  (DK) .............................. PA202070778

(51) Int. Cl.
    *H04L 67/00*     (2022.01)
    *H04M 1/72406*   (2021.01)
    *H04M 1/72409*   (2021.01)
    *H04M 1/72454*   (2021.01)

(52) U.S. Cl.
    CPC ... *H04M 1/72409* (2021.01); *H04M 1/72406* (2021.01); *H04M 1/72454* (2021.01)

(58) Field of Classification Search
    CPC ......... H04M 1/72409; H04M 1/72406; H04M 1/72454; H04W 4/70; H04W 4/80; H04W 4/00; H04W 88/00; H04B 1/385; H04B 2001/3872; H04B 5/0006; H04B 5/00; H04L 67/12; H04L 67/34; H04L 67/303; H04L 67/00; G06F 16/00; G06F 8/65; H04R 1/10
    See application file for complete search history.

(56) References Cited

U.S. PATENT DOCUMENTS

| 6,167,408 A * | 12/2000 | Cannon ............... H04L 41/0856 |
| | | 707/999.203 |
| 9,480,096 B1 * | 10/2016 | Lee ..................... H04W 12/065 |
| 10,623,246 B1 | 4/2020 | Iyer et al. |
| 2004/0148407 A1 | 7/2004 | Albertine Trappeniers et al. |
| 2007/0127397 A1 | 6/2007 | Pinder et al. |
| 2013/0018979 A1 * | 1/2013 | Cohen ..................... H04L 69/12 |
| | | 709/217 |
| 2013/0102282 A1 | 4/2013 | Cutts et al. |

(Continued)

FOREIGN PATENT DOCUMENTS

| EP | 2579663 | 4/2013 |
| EP | 2579663 A1 * | 4/2013 ............ H04W 28/18 |
| WO | WO 2019029740 | 2/2019 |

OTHER PUBLICATIONS

Extended European Search Report for EP Patent Appln. No. 21208754.8 dated Apr. 8, 2022.

(Continued)

*Primary Examiner* — Angelica Perez  
(74) *Attorney, Agent, or Firm* — Vista IP Law Group, LLP

(57) ABSTRACT

A communication device and an accessory device for a communication system is disclosed, the accessory device comprising a memory and an interface, wherein the memory comprises first coupling data comprising a first index parameter and a second index parameter, and wherein the accessory device is configured to output the first coupling data to a communication device via the interface.

24 Claims, 9 Drawing Sheets

(56) References Cited

U.S. PATENT DOCUMENTS

| | | | |
|---|---|---|---|
| 2013/0332632 A1* | 12/2013 | Rathi | H04W 12/069 |
| | | | 710/38 |
| 2014/0189801 A1* | 7/2014 | Rokusek | G06F 21/00 |
| | | | 726/4 |
| 2014/0317303 A1* | 10/2014 | Toprani | H04L 67/141 |
| | | | 709/227 |
| 2015/0119095 A1* | 4/2015 | Sim | H04W 4/10 |
| | | | 455/518 |
| 2016/0269259 A1* | 9/2016 | Kim | H04L 43/0817 |
| 2017/0359555 A1* | 12/2017 | Irani | G08B 21/182 |
| 2018/0246743 A1* | 8/2018 | Rossier | G06F 9/547 |
| 2019/0230431 A1* | 7/2019 | Raft | A61F 2/08 |
| 2020/0117777 A1* | 4/2020 | Brown | G06F 21/74 |
| 2020/0331483 A1 | 10/2020 | Saers et al. | |
| 2022/0019385 A1* | 1/2022 | Karr | G06F 3/0664 |
| 2022/0353624 A1* | 11/2022 | Recker | H04R 1/1008 |

OTHER PUBLICATIONS

Technical examination report issued on Nov. 25, 2021 for Danish patent application PA 2020 70778.
$1^{st}$ Technical Examination for Danish Patent Appln. No. PA 2020 70778 dated May 10, 2021.
Foreign Exam Report for EP Patent Appln. No. 21208754.8 dated Jun. 25, 2024.
Silicon Labs: "USB Audio Class Tutorial", Apr. 8, 2017 (Apr. 8, 2017), XP093175909, Retrieved from the Internet: URL: https://www.silabs.com/documents/public/application-notes/AN295.pdf.

* cited by examiner

|  | 63  56 | 55  40 | 39  24 | 23  8 | 7  3 | 2  0 |
|---|---|---|---|---|---|---|
| Header | 605 | 604 | 603 | 602 | 601 | 600 |

|  | 63 56 | 55 52 | 51 48 | 47 41 | 40 33 | 32 22 | 21 11 | 10 0 |
|---|---|---|---|---|---|---|---|---|
| CD 0 | 770 | 760 | 750 | 740 | 730 | 720 | 710 | 700 |
| CD 1 | 771 | 761 | 751 | 741 | 731 | 721 | 711 | 701 |
| CD 2 | 772 | 762 | 752 | 742 | 732 | 722 | 712 | 702 |

Fig. 4

COMMUNICATION SYSTEM WITH ACCESSORY DEVICE CONFIGURATION

RELATED APPLICATION DATA

This application claims priority to, and the benefit of, Danish Patent Application No. PA 2020 70778 filed on Nov. 24, 2020. The entire disclosure of the above application is expressly incorporated by reference herein.

FIELD

The present disclosure relates to a communication system, a communication device, and an accessory device.

BACKGROUND

In combat situations or other stressed environments with extreme environmental conditions such as war zones or battlefields, a user is deployed equipped with a large number of sensors, electronic devices, and hearing protection and/or communication systems. This may be part of a Situational Awareness and Command, Control, Communications, Computers (C4) setup.

SUMMARY

When a central unit controlling the system or parts of the system is involved, the central unit needs to be aware of configuration and availability of the devices of the system. This may be difficult due to re-configuration while being on a mission, or simply because there is an overwhelming amount of different devices that can be connected to the central control unit. Accordingly, there is a need for communication system, communication device, and accessory device with improved configurability of the communication system, and with an increased flexibility in system design.

An accessory device for a communication system is disclosed. The accessory device comprises a memory and an interface. The memory comprises first coupling data comprising a first index parameter and optionally a second index parameter. The accessory device is optionally configured to output the first coupling data to a communication device via the interface.

Further, a communication device is disclosed. The communication device comprises a processor, a memory, and an interface, wherein the interface is configured for connecting to an accessory device. The processor is configured to obtain coupling data from the accessory device. The processor is optionally configured to obtain accessory device configuration, optionally from the memory. based on the coupling data. The processor is optionally configured to operate the accessory device according to the accessory device configuration.

It is an advantage of the present disclosure that the disclosed accessory device enables an improved configurability of the communication system, and an increased flexibility in system design. The accessory device and communication device can also benefit from a higher degree of flexibility for updates, re-configurations etc. The user may also benefit from an increased ability to plug-and-play accessory devices. The disclosed accessory devices allow using a protocol for exchanging data with the communication device. It may be appreciated that the present disclosure enables a centralization in one entity for managing various configurations (such as all configurations) and enables control of the system behaviour. For example, the disclosure allows a system to be set up based on different connected accessory devices and permits to provide a "total system" overview which may improve the configuration of parameters to be associated with the coupling data.

It may be appreciated that the disclosed techniques allow for a reduced (such as minimum) amount of connectors to be assigned to make the communication device aware of the configuration. The disclosed technique allows an extendibility that fits with complex and user-configurable setups. The disclosed technique allows finding errors in an easier manner in a local configuration (e.g. on an Over-The-Ear, OTE, headset).

Advantageously, since no parameters are stored in the accessory devices, new firmware features can be introduced without having to re-program all accessory devices. This leads to an improved method for updating, upgrading and/or adapting the system to future requirements.

Further, the present disclosure reduces the need for updating accessory devices since the communication device merely obtains index parameters from the accessory device.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
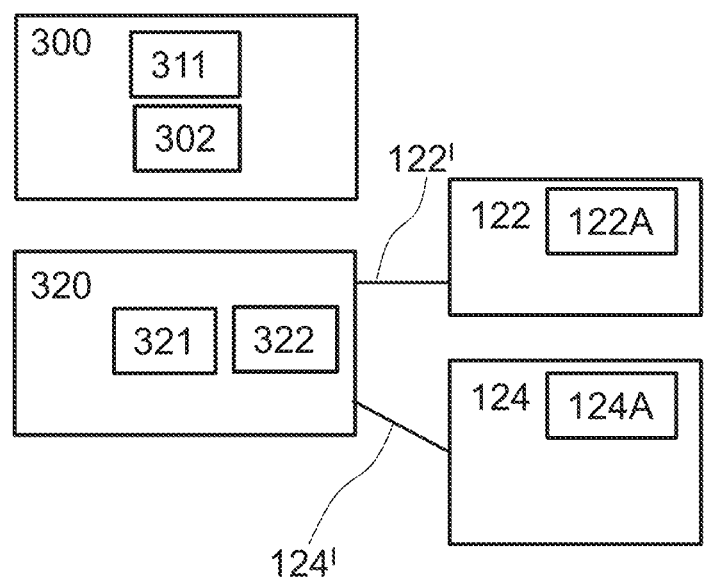
FIG. 1 schematically illustrates an exemplary communication system including an example communication device and an example accessory device according to this disclosure, FIG. 2 schematically illustrates exemplary coupling data according to this disclosure, FIGS. 3A-3B schematically illustrates an example communication device and an example accessory device according to this disclosure, FIG. 4 schematically illustrates exemplary coupling data with exemplary header data according to this disclosure, FIG. 5 schematically illustrates an example accessory device according to this disclosure FIG. 6 schematically illustrates an example communication device and an example accessory device according to this disclosure, FIG. 7 schematically illustrates an example communication device and an example accessory device according to this disclosure, and FIG. 8 schematically illustrates an example communication device and an example accessory device according to this disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

An accessory device may be seen as a device (e.g. equipment) which is configured to communicate with a communication device of the communication system. For example, an accessory device may comprise one or more of: a hearing device (such as a headset), a data-link device, a camera device, a communication radio device, an intercom device, a power source, and a cable. The accessory device(s) can be part of a Dismounted Soldier System. The accessory device(s) can be part of a Mounted Soldier System.

A communication device disclosed herein may be seen as a device configured to connect with an accessory device, for operation, and/or configuration. For example, the communication can be a Central Control Unit with a generic interface that facilitates the integration of soldier-worn devices e.g. in Audio, Data, Power and Control.

The term "coupling data" used herein may be seen as data enabling a coupling of the accessory device with a communication device so that the communication device can properly operate the accessory device and/or configure the accessory device, based on reading the coupling data stored on the accessory device. Coupling the accessory device with a communication device may be seen as enabling communication, and/or allowing configuration of the accessory device by the communication device. The coupling data may be seen as enabling a generic interface used in a dismounted and/or a mounted soldier system, such as a Generic Soldier Interface. For example, the coupling data can be used for detecting the attached accessory device(s) and for controlling and monitoring a state of a system configuration of the accessory device, e.g. a current system configuration. For example, a cable can be identified by a build-in One-Wire electrically erasable programmable read-only memory, EEPROM. For example, an input/output, I/O, powered one-wire interface with a memory size large enough can support a N-bit (such as 64-bit) coupling data and the possibility to store more cable and customer specific configurations. For example, the coupling data can be used by the communication device to look-up different configurations and/or behaviours associated with the accessory device when reading the coupling data from the accessory device, and retrieving the different configurations and/or behaviours from a memory of the communication device. It may be envisaged that the coupling data indexes different configurations and/or behaviours which are to be retrieved by the communication device from a local memory and/or a remote memory. In one or more examples, the same coupling data can be used over a range of different accessory devices. For example, the coupling data may not be locked to manufacturer, and/or a model, such as an accessory model, such as a radio model.

In one or more examples, the communication device may be configured to obtain (such as retrieve) the accessory device configuration from an external memory, such as a remote memory, which may be part of any entity in the communication system other than the communication device. For example the entity may be a remote accessory device, a remote database, and/or a remote server. For example, the communication device can get the accessory device configuration from a OTE device (such as a headset), and/or a memory attached to the OTE device. In one or more example communication device, to obtain the accessory device configuration comprises to request, based on the coupling data, the accessory device configuration and to receive the accessory device configuration The term "index parameter" disclosed herein may be seen as a parameter indicative of an operating capability and/or an operating requirement of an accessory device. For example, the index parameter is a parameter that indexes one or more capabilities of the accessory devices, such as one or more functionalities of the accessory device. For example, an index parameter can be used by the communication device to look-up a corresponding configuration and/or a corresponding behaviour associated with the accessory device when reading the coupling data from the accessory device, and retrieving the corresponding configuration and/or a corresponding behaviour from a memory of the communication device. It may be envisaged that the index parameters are one or more configuration parameters (e.g. representative of a behaviour) which are to be retrieved by the communication device from a local memory and/or a remote memory.

For example, the one or more functionalities may be related to one or more of audio, data, AUX, headset, input power, output power, and control. Examples of index parameters may include one or more audio index parameters, one or more data index parameters, one or more headset index parameters, one or more AUX index parameters, one or more power index parameters, and/or one or more control index parameters. For example, the one or more functionalities of the accessory device may comprise one or more audio functionalities, one or more data functionalities, one or more headset functionalities, one or more power functionalities, one or more control functionalities. The one or more audio functionalities may relate to one or more audio profiles e.g. two different single channel half-duplex radios or the combination of two radios delivering half-duplex and full-duplex capabilities. The data functionality may be for interfaces that provide either downstream or upstream Universal Serial Bus, USB, data e.g. an End User Device, EUD, tactical radios with data based on IP over USB standards like Remote Network Driver Interface Specification (RNDIS), HD cameras, etc. For example, an EUD comprises one or more of: a mobile phone (such as a military mobile phone, such a military mission-ready mobile phone), and a tablet (such as a tactical operation tablet) For example, a data index parameter may be used stand alone for more data driven interfaces, or in combination with other index parameters in e.g. split-cable setups or with interfaces providing both Audio and Data. The headset index parameter and the AUX index parameter may be used to identify a connected headset type e.g. Over The Ear (OTE), In the Ear (ITE) and if an auxiliary microphone or audio input has been added to the communication system. The power functionality may be seen as related to power management and distribution of power. The power index parameter may provide the system with information about what kind of power sources or sinks is available in a specific soldier configuration. The control index parameter may indicate how to utilize the general purpose Input/Output (I/O) interfaces available on the coupling data disclosed herein. The control index parameter can add the possibility to detect, control and receive information from external Push to talk (PTT), torches, and/or head-trackers.

The present disclosure provides an accessory device for a communication system. The accessory device comprises a memory and an interface.

The memory comprises first coupling data. The first coupling data comprises a first index parameter and a second index parameter.

In one or more exemplary accessory devices, the first coupling data comprises at least three index parameters, such as at least four index parameters, such as five or more index parameters. In one or more exemplary accessory devices, the first coupling data comprises a third index parameter, and optionally a fourth index parameter, and optionally a fourth index parameter, and optionally a fifth index parameter, and optionally a seventh index parameter.

The accessory device is configured to output the first coupling data to a communication device via the interface. The present disclosure relates to a communication system comprising the accessory device and a communication device. The communication device may be configured to connect with the accessory device.

It is an advantage of the present disclosure that the disclosed accessory device enables an improved configurability of the communication system, and an increased flexibility in system design. The accessory device and communication can also benefit from a higher degree of flexibility for updates, re-configurations etc. The user may also benefit from an increased ability to plug-and-play accessory devices. The disclosed accessory devices allow using a protocol for exchanging data with the communication device. In one or more exemplary accessory devices, the interface of the accessory device comprises a connector, wherein the memory comprising first coupling data is arranged in the connector.

In one or more exemplary accessory devices, the first index parameter is selected from a first set of index parameters. In one or more exemplary accessory devices, the first index parameter is an index parameter of a first type selected from a control index parameter, a power index parameter, an AUX index parameter, a headset index parameter, a data index parameter, a first audio index parameter, and a second audio index parameter. Stated differently, the first index parameter may be an index parameter of the first type in that the first index parameter is indicative of a first type associated with one or more of the following functionalities of the accessory device: a control functionality, a power functionality, an AUX functionality, a headset functionality, a data functionality, a first audio functionality, and a second audio functionality. For example, the first type may comprise one or more of: a control type, a power type, an AUX type, a headset type, a data type, a first audio type, and a second audio type. In other words, the first index parameter may comprise one or more of: a control index parameter, a power index parameter, an Aux index parameter, a headset index parameter, a data index parameter, a first audio index parameter, and a second audio index parameter.

In one or more exemplary accessory devices, the second index parameter is selected from a second set of index parameters. In one or more exemplary accessory devices, the second index parameter is an index parameter of a second type different from the first type and selected from a control index parameter, a power index parameter, an AUX index parameter, a headset index parameter, a data index parameter, a first audio index parameter, and a second audio index parameter. For example, the first index parameter may be different from the second index parameter. For example, the first index parameter and the second index parameter are of different types. For example, the first type is different from the second type. For example, when the first index parameter is a first audio index parameter, then the second index parameter is selected from one or more of: a control index parameter, a power index parameter, an AUX index parameter, a headset index parameter, a data index parameter, and a second audio index parameter.

In one or more exemplary accessory devices, the memory comprises second coupling data comprising a first index parameter and a second index parameter. In one or more exemplary accessory devices, the accessory device is configured to output the second coupling data to the communication device via the interface.

In one or more exemplary accessory devices, the memory comprises third coupling data comprising a first index parameter and a second index parameter. In one or more exemplary accessory devices, the accessory device is configured to output the third coupling data to the communication device via the interface.

In one or more exemplary accessory devices, the accessory device is configured to receive a write request indicative of coupling data from the communication device; and storing the coupling data as the second coupling data. The write request may be seen as request to write onto the memory of the accessory device, such as to store coupling data as the second coupling data in the memory.

In one or more exemplary accessory devices, the accessory device is configured to receive a write request indicative of coupling data from the communication device; and storing the coupling data as the first coupling data.

In one or more exemplary accessory devices, the memory comprises third coupling data comprising a first index parameter and/or a second index parameter. The accessory device may be configured to output the third coupling data to a communication device via the interface. In one or more exemplary accessory devices, the accessory device is configured to receive a write request indicative of coupling data from the communication device; and storing the coupling data as third coupling data.

It may be envisaged that coupling data may be defined for each accessory device of a plurality of accessory devices, allowing configuration and/or operation of each accessory device.

In one or more exemplary accessory devices, the accessory device may comprise a processor configured to obtain accessory device configuration based on coupling data. In one or more exemplary accessory devices, the accessory device comprising a processor configured to obtain accessory device configuration based on coupling data may be seen as an accessory device in active mode.

In one or more exemplary accessory devices, an accessory device with a memory and an interface may be seen as an accessory device in passive mode.

In one or more exemplary accessory devices, the memory comprises header data optionally comprising a first coupling parameter and/or a second coupling parameter. The header data may comprise a third coupling parameter.

For example the header data may comprise one or more of: a cyclic redundancy check, CRC, parameter, a version parameter, and a mode parameter. A CRC parameter may be a parameter for error detecting, e.g. using an error-detecting code to detect modification in the coupling data. For example, when a read from coupling data is executed, the data may be corrupted by noise. To avoid this, use of error-detecting codes which are additional data added to a given digital message to help detect if an error occurred during read. The header data includes e.g. 8 bit dedicated to error handling which could also include error-correcting codes. This provides the same strategy as error-detecting codes but adds the ability to detect which bits have been corrupted. For example, the first coupling parameter is a coupling data indicator indicative of the first coupling data, such as presence of the first coupling data. For example, the second coupling parameter is a coupling data indicator indicative of the second coupling data, such as presence of the second coupling data. The third coupling parameter may be a coupling data indicator indicative of the third coupling data. A coupling parameter can give a significance and an indicator of the origin of the different parameters of the coupling data. This can be advantageous in active implementation like a generic splitter. An example of an active splitter accessory device is illustrated in FIG. 4. In FIG. 4, the output from the active generic splitter is a combination of the three different inputs, two radios and a battery, and this is supported by the coupling data which identifies the origin of the indexes. This is useful e.g. for the audio part, as this can now be treated as two separate nets by the hosting control unit.

A version parameter may be indicative of a version of coupling data (e.g. bits to identify the implementation version of the coupling data, e.g. less than 10 bits, such as less than 5 bits, such as 3 bits), e.g. for supporting different coupling data structures and allowing for future firmware to support legacy coupling data while offering new features.

A mode parameter may be indicative of a type of accessory device, and/or a mode of usage for the type of accessory device. For example, a mode parameter may indicate an active mode or a passive mode. A passive mode for example does not allow any active function and has a limited access to the memory. An active mode allows supporting extended usage, reacting actively thereby allowing for a protocol for exchanging data. A passive mode may be associated with a type of accessory such as a cable, and/or a headset-adapter. An active mode may be associated with a type of accessory such as a splitter, headsets, and/or an intercom. In passive mode, the interface is for example detected by a I/O powered one-wire EEPROM. The passive mode may be intended for passive cables that interconnect to radios, power sources, and/or data sources. In active mode, the interface includes for example an 8-bit low power microcontroller. The active mode can take as inputs several passive or active interfaces and combine them into one coupling data. The active mode may be intended for interface that either split one generic soldier interface into more interfaces, OTE headsets, or in extension interfaces such as Audio, Data and Power multiple interface points. In other words, a mode can indicate that an active splitter can benefit from getting information of what exactly is connected on a host (a communication device, such as a control unit) side. This can allow for a calibration extension where a headset can give access to e.g. production calibration values, filters etc. which size is now only limited by the amount of memory attached to a microphone controller. For example, an active splitter implementation needs a specified update rate in order to configure the system based on new cables being connected to the system, whereas a passive splitter needs to be read with a much lower rate.

In one or more exemplary accessory devices, the accessory device is configured to obtain first secondary coupling data from a first secondary accessory device and determine the first coupling data based on the first secondary coupling data. For example, the first secondary accessory device may be an Aux device for attachment to the accessory device which may be a headset, a split cable, and/or an active micro controller unit, MCU. For example, the accessory device configured to obtain first secondary coupling data from a first secondary accessory device and determine the first coupling data based on the first secondary coupling data may be seen as an accessory device in active mode, such as an active accessory device.

Further, a communication device is disclosed. The communication device comprises a processor, a memory, and an interface. The interface is configured for connecting to an accessory device, such as the accessory device disclosed herein. The processor is configured to obtain coupling data from the accessory device, such as via the interface. The processor is optionally configured to obtain accessory device configuration, for example from the memory or from an external memory (such as a remote memory), based on the coupling data, e.g. by mapping the coupling data to an accessory device configuration. In other words, the coupling data may be seen as a set of indicators associated with corresponding accessory device configuration data, such as a set of pointers, that the processor uses for retrieving or obtaining the accessory device configuration, e.g. in a lookup table stored in the memory of the communication device. This allows an enhanced configurability of the accessory device by the communication device. The processor is optionally configured to operate the accessory device according to the accessory device configuration.

FIG. 1 shows exemplary accessory devices 300, 320, 122, 124 according to this disclosure. The accessory device 300 comprises an interface 302 and a memory 311. The memory 311 comprises first coupling data. The first coupling data comprises a first index parameter and optionally a second index parameter.

The accessory device 320 comprises a memory 321 and an interface 322. The interface 322 is configured for connecting to an accessory device 122, 124 (such as via link 122' and 124'). The accessory device 320 is configured to obtain coupling data from the accessory device 122 and/or 124. The accessory device 320 is optionally configured to obtain accessory device configuration from the memory 321 based on the coupling data. The accessory device 320 is optionally configured to operate the accessory device 122, 124 according to the accessory device configuration. The accessory device 320 may comprise a processor configured to obtain accessory device configuration based on the coupling data. In one or more example, the accessory device 320 may be seen as an accessory device in active mode, while accessory device 122 or 124 may be seen as an accessory device in passive mode.

The accessory device 122 comprises a memory 122A including coupling data. The accessory device 124 comprises a memory 124A including coupling data. Accessory devices 122, 124, 300 may be seen as accessory devices in passive modes. Accessory device 320 may be seen as an accessory device in active mode.

Figure 2:

FIG. 2 schematically illustrates exemplary coupling data 800 according to this disclosure. The coupling data 800 comprises a control index parameter 77 (e.g. in bit position 56-63), a power index parameter (including an input power index parameter 76 (e.g. in bit position 52-55) and an output power index parameter 75 (e.g. in bit position 48-51), an AUX index parameter 74 (e.g. in bit position 41-47), a headset index parameter 73 (e.g. in bit position 33-40), a data index parameter 72 e.g. in bit position 22-32), a first audio index parameter 71 (e.g. in bit position 11-21), and a second audio index parameter 70 (e.g. in bit position 0-10).

The position of the index parameters depends for example on the length of each index parameter and may vary.

The index parameters disclosed herein may be in the following ranges e.g.:

| Index parameter | Range |
|---|---|
| First Audio index 71 | 2048 |
| Second Audio index 70 | 2048 |
| Data index 72 | 2048 |
| Headset index 73 | 256 |
| Aux index 74 | 128 |
| Power Out index 75 | 16 |

-continued

| Index parameter | Range |
| --- | --- |
| Power In index 76 | 16 |
| Control index 77 | 256 |

Figure 3A:
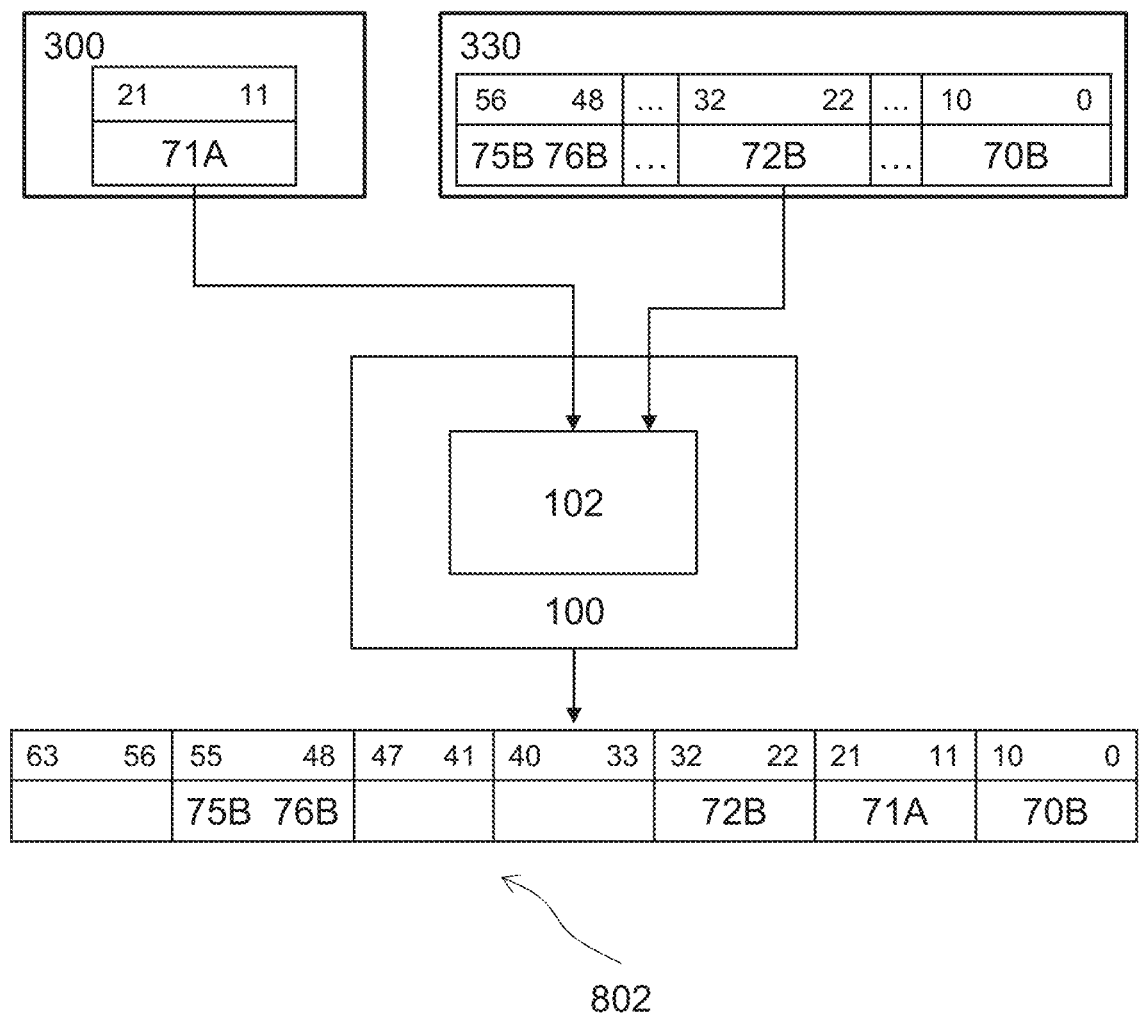
Figure 3B:
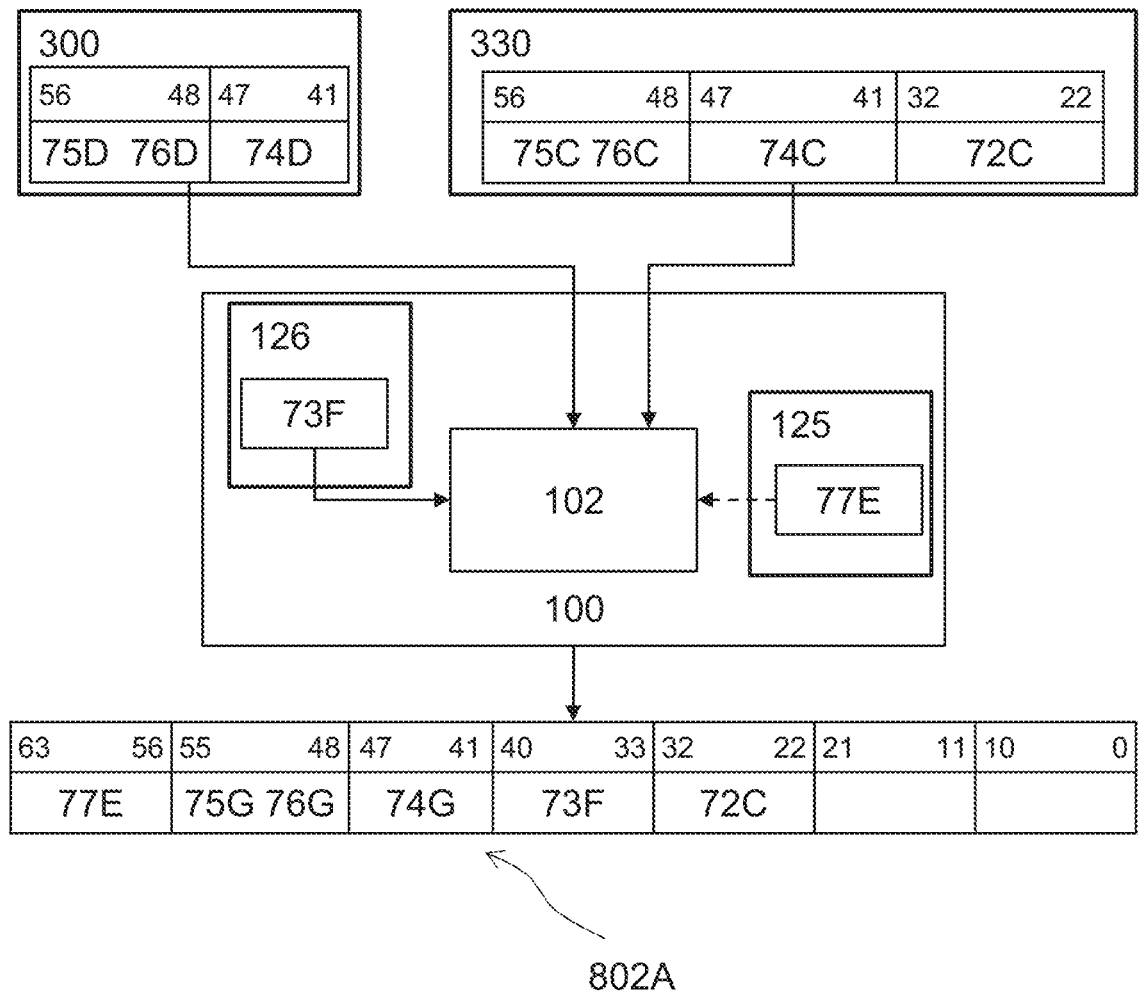

FIGS. 3A-3B schematically illustrate an example communication device 100 and an example accessory device 300, 330.

according to this disclosure. The communication device 100 is configured to communicate with accessory devices 300, 330. The communication device 100 comprises a processor 102. The accessory device 300 comprises a memory comprising coupling data. The coupling data comprises a first audio index parameter 71A.

The accessory device 330 comprises a memory comprising coupling data. The coupling data of accessory device 330 comprises an input power index parameter 76B, an output power index parameter 75B, a data index parameter 72B, and a second audio index parameter 70B.

The processor 102 is configured to obtain coupling data from the accessory devices 300 and 330. The coupling data from 300 and the coupling data from 330 is taken as input by the processor 102, and combined by the processor 102 into resulting coupling data 802. The resulting coupling data 802 comprises an input power index parameter 76B, an output power index parameter 75B, a data index parameter 72B, and a second audio index parameter 70B, and a first audio index parameter 71A. The processor 100 is configured to obtain accessory device configuration from the memory based on the resulting coupling data 802. The processor 102 is configured to operate the accessory device 300, 330 according to the accessory device configuration coupling data.

Communication device 100 of FIG. 3B is configured to communicate with accessory devices 300, 330. Communication device 100 comprises a processor 102, a first accessory device 125, and a second accessory device 126. Accessory device 125 provides coupling data including a control index parameter 77E. Accessory device 125 provides coupling data including a headset index parameter 73F.

Accessory device 300 comprises a memory comprising coupling data. The coupling data comprises a power index parameter, such as an output power index parameter 75D and an input power index parameter 76D, and an AUX index parameter 74D.

Accessory device 330 comprises a memory comprising coupling data. The coupling data comprises a power index parameter 75C 76C, an AUX index parameter 74C, and a data index parameter 72C.

The processor 102 is configured to obtain coupling data from the accessory device 300 and coupling data from 330. The coupling data from 300 and the coupling data from 300 is taken as input by the processor 102, and combined by the processor 102 into resulting coupling data 802A.

The resulting coupling data 802A comprises a control index parameter 77E, a power index parameter (e.g. including an output power index parameter 75G, and an input power index parameter 76G), an AUX index parameter 74D, a headset index parameter 73F, and a data index parameter 72C.

The resulting coupling in 802A may be seen as a result determined by a splitter software which determines the resulting Aux index parameter 74G, the output power index parameter 75G, and the input power index parameter 76G. The output power index parameter 75G may be selected to be 75D or 75C or a combination of 75D and 75C. The output power index parameter 75G may be determined as third value by the processor 102. The input power index parameter 76G may be selected to be 76D or 76C or a combination of 76D and 76C. The input power index parameter 76G may be determined as third value by the processor 102. The Aux index parameter 74G may be selected to be 74D or 74C or a combination of 74D and 74C. The Aux index parameter 74G may be determined as third value by the processor 102.

The processor may determine which index parameter to choose (or which new index parameter to replace the index parameters with) dynamically or based on a hardcoded table.

The processor 102 is configured to obtain accessory device configuration from the memory based on the resulting coupling data 802A. The processor 102 is configured to operate the accessory device 300, 330 according to the accessory device configuration coupling data.

FIG. 4 schematically illustrates exemplary coupling data with exemplary header data according to this disclosure.

The header data comprises a first coupling parameter and a second coupling parameter. For example the header data comprises a cyclic redundancy check, CRC, parameter 605, a version parameter 600, a mode parameter 601, a first coupling data indicator 602 indicating the presence of the first coupling data CD0, a second coupling data indicator 603 indicating the presence of the second coupling data CD1, and a third coupling data indicator 604 indicating the presence of the third coupling data CD2.

The first coupling data CD0 comprises a control index parameter 770 (e.g. in bit position 56-63), a power index parameter (including an input power index parameter 760 (e.g. in bit position 52-55) and an output power index parameter 750 (e.g. in bit position 48-51), an AUX index parameter 740 (e.g. in bit position 41-47), a headset index parameter 730 (e.g. in bit position 33-40), a data index parameter 720 e.g. in bit position 22-32), a first audio index parameter 710 (e.g. in bit position 11-21), and a second audio index parameter 700 (e.g. in bit position 0-10).

The second coupling data CD1 comprises a control index parameter 771 (e.g. in bit position 56-63), a power index parameter (including an input power index parameter 761 (e.g. in bit position 52-55) and an output power index parameter 751 (e.g. in bit position 48-51), an AUX index parameter 741 (e.g. in bit position 41-47), a headset index parameter 731 (e.g. in bit position 33-40), a data index parameter 721 e.g. in bit position 22-32), a first audio index parameter 711 (e.g. in bit position 11-21), and a second audio index parameter 701 (e.g. in bit position 0-10).

The third coupling data CD2 comprises a control index parameter 772 (e.g. in bit position 56-63), a power index parameter (including an input power index parameter 762 (e.g. in bit position 52-55) and an output power index parameter 752 (e.g. in bit position 48-51), an AUX index parameter 742 (e.g. in bit position 41-47), a headset index parameter 732 (e.g. in bit position 33-40), a data index parameter 722 e.g. in bit position 22-32), a first audio index parameter 712 (e.g. in bit position 11-21), and a second audio index parameter 702 (e.g. in bit position 0-10).

Figure 5:
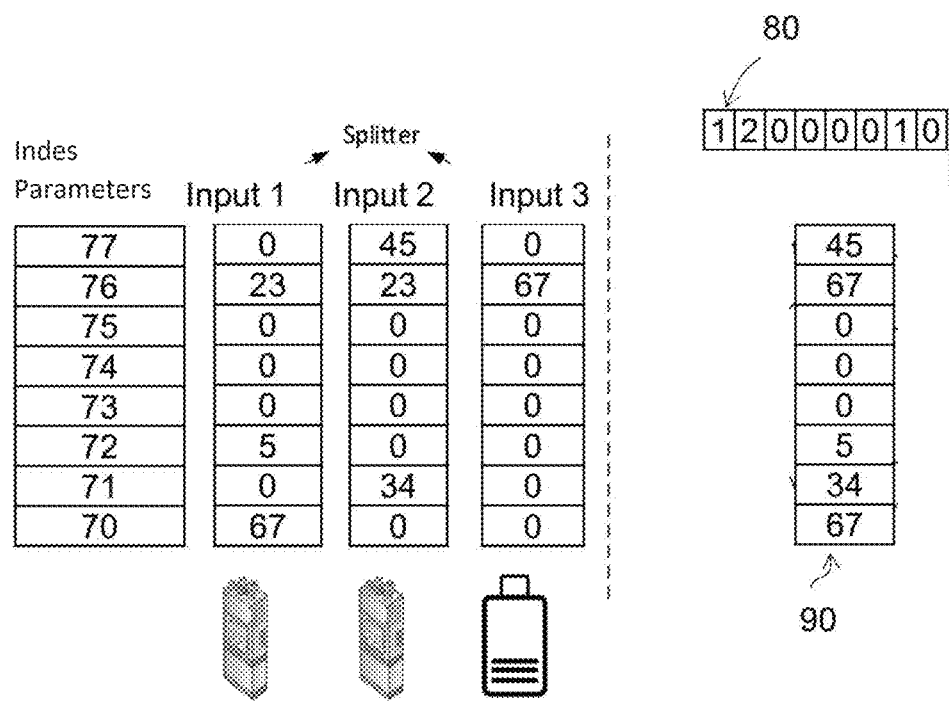

FIG. 5 schematically illustrates a scenario according to this disclosure. An example of an active splitter is observed in FIG. 5. The output from the active generic splitter is a combination of the three different inputs: input 1, input 2, input 3. Input 1 and 2 correspond to two radio accessory devices (such as single net radio with data and power, single net radio with power and talk-group control respectively). Input 3 corresponds to a battery accessory device. The field considered of the coupling data represented comprises a control index parameter 77, a power index parameter (including an input power index parameter 76 and an output power index parameter 75), an AUX index parameter 74, a headset index parameter 73, a data index parameter 72, a first audio index parameter 71, and a second audio index parameter 70.

The active splitter can combine the coupling data of each input based on the coupling indicator 80 which identifies the source of the parameter indexes (e.g. 0 indicates input 1, 1 indicates input 2, and 2 indicates input 3) to follow in the combination of the coupling data to obtain the resulting coupling data 90. For example, the coupling indicator 80 indicates 1, 2, 0, 0, 0, 0, 1, 0, which indicates to take the following values:

the value of input 2, which is 45 for control index parameter 77,
the value of input 3, which is 67 for input power index parameter 76,
the value of input 1, which is 0 for output power index parameter 75,
the value of input 1, which is 0 for AUX index parameter 74,
the value of input 1, which is 0 for headset index parameter 73,
the value of input 1, which is 5 for data index parameter 72,
the value of input 2, which is 34 for first audio index parameter 71, and
the value of input 1, which is 67 for second audio index parameter 70.

This is useful e.g. for the audio part, as this can now be treated as two separate nets by the hosting control unit.

Figure 6:
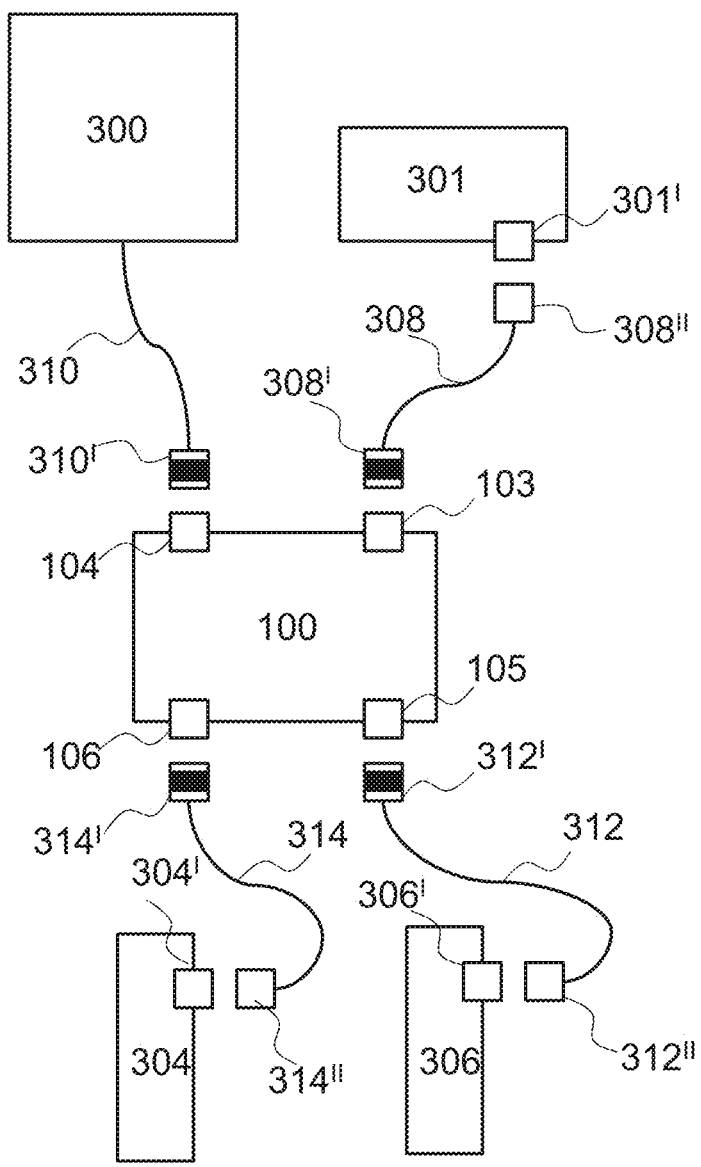

FIG. 6 schematically illustrates an example communication device 100 and example accessory devices 300 (e.g. an ITE device), 301 (e.g. an EUD device), 304 (e.g. a first radio device), 306 (e.g. a second radio device), 308, 310, 312, 314 according to this disclosure.

Communication device 100 is configured to communicate with accessory device 300 via interface 104, and accessory device 310 (e.g. a cable). Accessory device 310 uses its interface 310' to connect to interface 104.

Communication device 100 is configured to communicate with accessory device 301 via interface 103, and accessory device 308 (e.g. a cable). Accessory device 308 uses its interface 308' to connect to interface 103 and its interface 308" to connect to interface 301' of accessory device 301.

Communication device 100 is configured to communicate with accessory device 304 via interface 106, and accessory device 314 (e.g. a cable). Accessory device 314 uses its interface 314' to connect to interface 106 and its interface 314" to connect to interface 304' of accessory device 304.

Communication device 100 is configured to communicate with accessory device 306 via interface 105, and accessory device 312 (e.g. a cable). Accessory device 312 uses its interface 312' to connect to interface 105 and its interface 312" to connect to interface 306' of accessory device 306.

Accessory devices 308, 310, 312, 314 may be seen as in passive mode as indicated in by the black boxes representative of respective memories comprising coupling data for use in passive mode.

Figure 7:
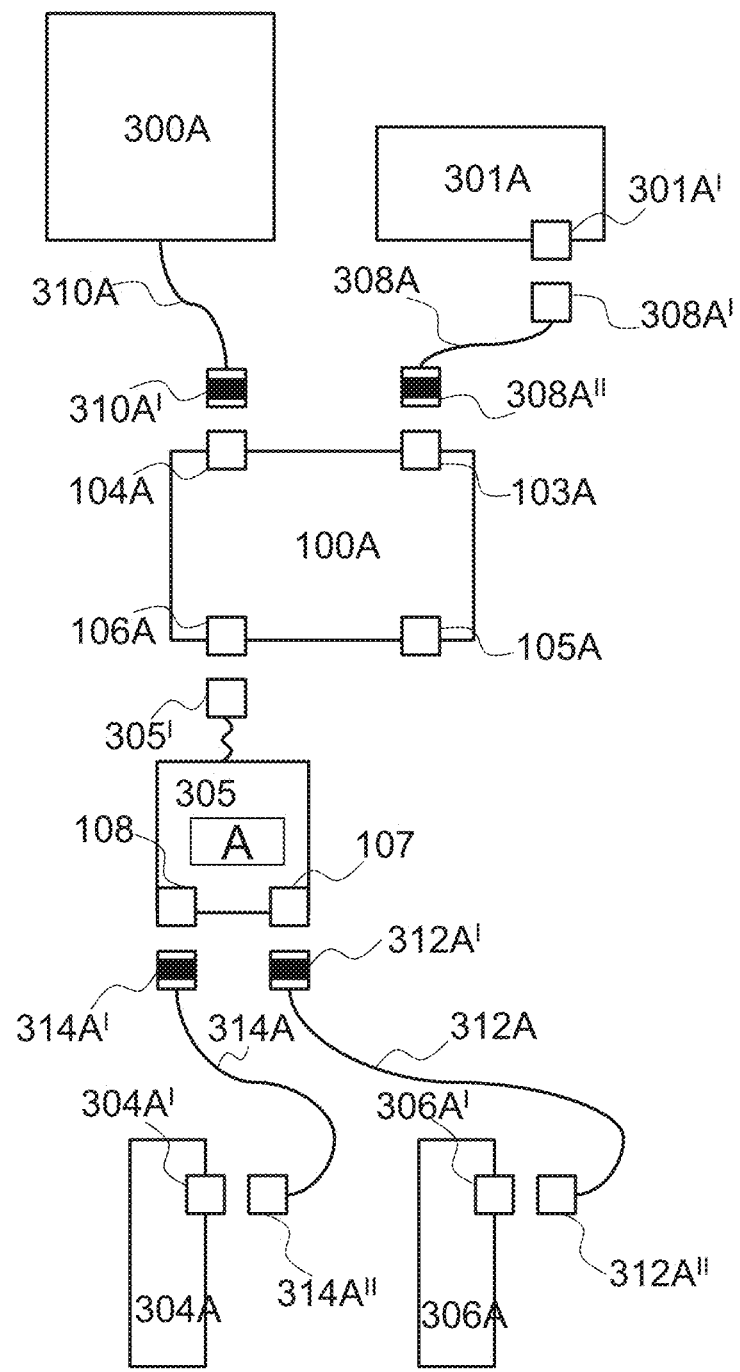

FIG. 7 schematically illustrates an example communication device 100A and example accessory devices 300A (e.g. an ITE device), 301A (e.g. an EUD device), 304A (e.g. a first radio device), 306A (e.g. a second radio device), 305 (e.g. an active splitter), 308A, 310A, 312A, 314A according to this disclosure.

Communication device 100A is configured to communicate with accessory device 300A via interface 104A, and accessory device 310A (e.g. a cable). Accessory device 310A uses its interface 310A' to connect to interface 104A.

Communication device 100A is configured to communicate with accessory device 301A via interface 103A, and accessory device 308A (e.g. a cable). Accessory device 308A uses its interface 308A" to connect to interface 103A and its interface 308A' to connect to interface 301A' of accessory device 301A.

Communication device 100A is configured to communicate with accessory device 305 via interface 106A. Accessory device 305 is configured to communicate with the communication device 100A via interface 305', accessory device 304A via interface 108, and accessory device 314A (e.g. a cable). Accessory device 314A uses its interface 314A' to connect to interface 108 and its interface 314A" to connect to interface 304A' of accessory device 304A.

Accessory device 305 is configured to communicate with accessory device 306A via interface 107, and accessory device 312A (e.g. a cable). Accessory device 312A uses its interface 312A' to connect to interface 107 and its interface 312A" to connect to interface 306A' of accessory device 306A.

Accessory devices 308A, 310A, 312A, 314A may be seen as in passive mode as indicated in by the black boxes representative of respective memories comprising coupling data for use in passive mode. Accessory device 305 may be seen as in active mode indicated in by the box A representative of a memory comprising coupling data for use in active mode.

Figure 8:
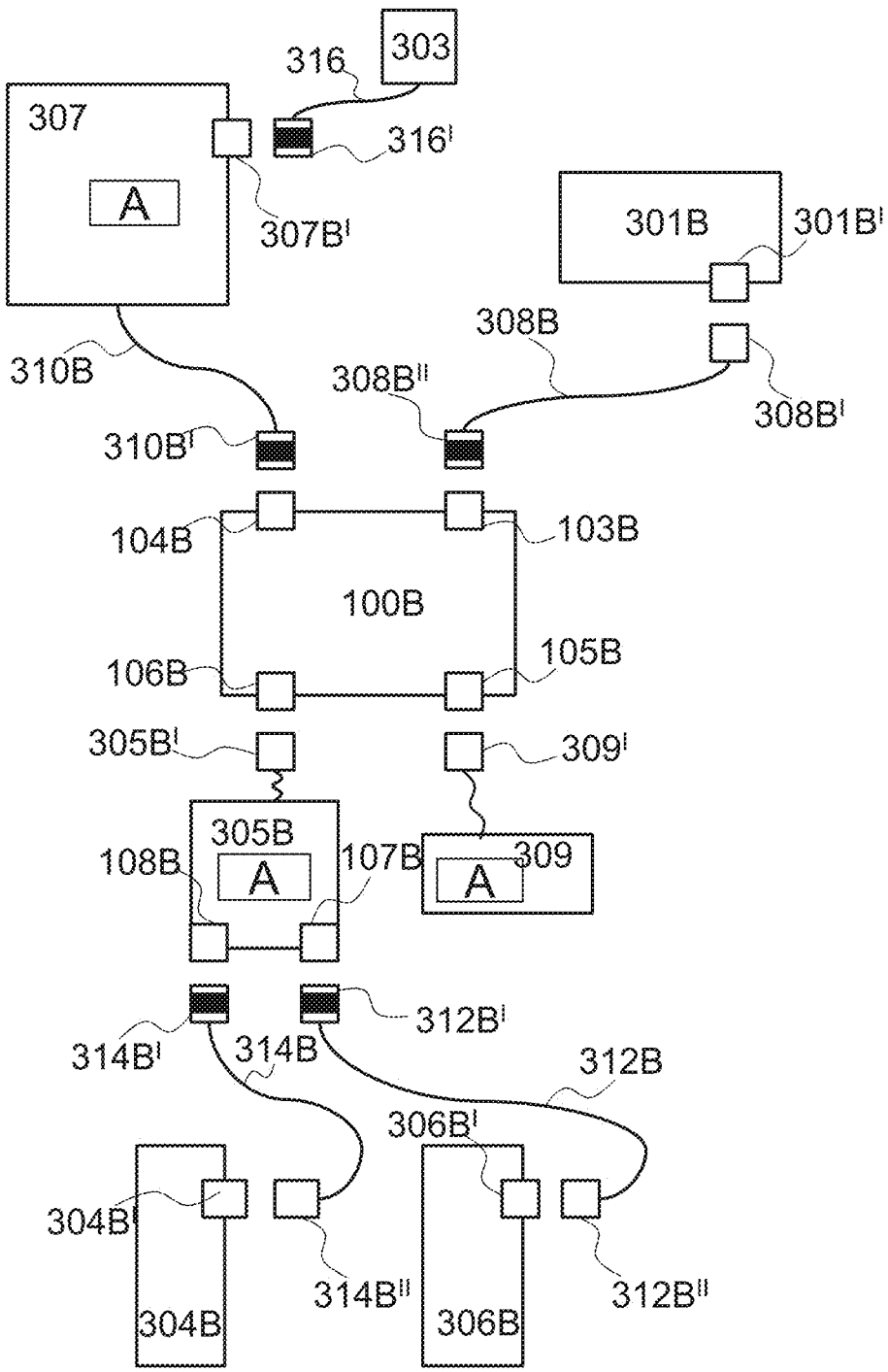

FIG. 8 schematically illustrates an example communication device 100B and example accessory devices 301B (e.g. an EUD device), 304B (e.g. a first radio device), 306B (e.g. a second radio device), 305B (e.g. an active splitter), 303 (e.g. a camera), 307 (e.g. an OTE device), 308B, 309 (e.g. a push-to-talk device), 310B, 312B, 314B according to this disclosure.

Communication device 100B is configured to communicate with accessory device 307 via interface 104B, and accessory device 310B (e.g. a cable). Accessory device 310B uses its interface 310B' to connect to interface 104B.

The accessory device 307 is configured to communicate with accessory device 303 via interface 307B', and accessory device 316 (e.g. a cable). Accessory device 316 uses its interface 316' to connect to interface 307B'.

Communication device 100A is configured to communicate with accessory device 301B (e.g. an EUD) via interface 103B, and accessory device 308B (e.g. a cable). Accessory device 308B uses its interface 308B" to connect to interface 103B and its interface 308B' to connect to interface 301B' of accessory device 301B.

Communication device 100B is configured to communicate with accessory device 305B (e.g. an active splitter device) via interface 106B. Accessory device 305B is configured to communicate with 100B via interface 305B' and with accessory device 304B (e.g. a radio device) via interface 108B, and accessory device 314B (e.g. a cable). Accessory device 314B uses its interface 314B' to connect to interface 108B and its interface 314B" to connect to interface 304B' of accessory device 304B.

Accessory device 305B is configured to communicate with accessory device 306B (e.g. a radio device) via interface 107B, and accessory device 312B (e.g. a cable). Accessory device 312B uses its interface 312B' to connect to interface 107B and its interface 312B" to connect to interface 306B' of accessory device 306B.

Communication device 100B is configured to communicate with accessory device 309 via interface 105B, and accessory device interface 309'.

Accessory devices 308B, 309, 310B, 312B, 314B, 316B may be seen as in passive mode as indicated in by the black boxes, each representative of respective memories comprising coupling data for use in passive mode. Accessory device 305B may be seen as in active mode as indicated in by boxes A representative of respective memories comprising coupling data for use in active mode.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-8 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

CD0 first coupling data
CD1 second coupling data
CD2 third coupling data
0-10 bit position
11-21 bit position
22-32 bit position
33-40 bit position
41-47 bit position
48-56 bit position
57-64 bit position
70 second audio index parameter
70B second audio index parameter
71 first audio index parameter
71A first audio index parameter
data index parameter
72B data index parameter
72C data index parameter
73 headset index parameter
73F headset index parameter
74 AUX index parameter
74C AUX index parameter
74D AUX index parameter
74G AUX index parameter
output power index parameter
75B output power index parameter
75C output power index parameter
75D output power index parameter
75G output power index parameter
76 input power index parameter
76B input power index parameter
76C input power index parameter
76D input power index parameter
76G input power index parameter
77 control index parameter
77E control index parameter
80 coupling indicator
90 coupling data
100 communication device
100A communication device
100B communication device
102 processor
103 interface
103A interface
103B interface
104 interface
104A interface
104B interface
105 interface
105A interface
105B interface
106 interface 106A interface
106B interface
107 interface
107B interface
108 interface
108B interface
122 accessory device
122' link
122A memory
124 accessory device
124' link
124A memory
125 first accessory device
126 second accessory device
300 accessory device
300A accessory device
301' interface
301A accessory device
301A' interface
301B accessory device
301B' interface
302 interface
303 accessory device
304 accessory device
304' interface
304A accessory device
304A' interface
304B accessory device
304B' interface
305 accessory device
305' interface
305B accessory device
305B' interface
306 accessory device
306' interface
306A accessory device
306A' interface
306B accessory device
306B' interface
307 accessory device
308 accessory device
308' interface
308" interface
308A accessory device
308A' interface
308A" interface
308B accessory device
308B' interface
308B" interface
309 accessory device
309' interface
310 accessory device
310' interface
310A accessory device
310A' interface
310B accessory device
310B' interface
311 memory
312 accessory device
312' interface
312" interface
312A accessory device
312A' interface
312A" interface
312B accessory device
312B' interface
312B" interface
314 accessory device
314' interface
314" interface
314A accessory device
314A' interface
314A" interface
314B accessory device
314B' interface
314B" interface
316 accessory device
316' interface
320 accessory device
321 memory
322 interface
330 accessory device
600 version parameter
601 mode parameter
602 first coupling data indicator
603 second coupling data indicator
604 third coupling data indicator
605 cyclic redundancy check parameter
700 second audio index parameter
701 second audio index parameter
702 second audio index parameter
710 first audio index parameter
711 first audio index parameter
712 first audio index parameter
720 data index parameter
721 data index parameter
722 data index parameter
730 headset index parameter
731 headset index parameter
732 headset index parameter
740 AUX index parameter
741 AUX index parameter
742 AUX index parameter
750 output power index parameter
751 output power index parameter
752 output power index parameter
760 input power index parameter
761 input power index parameter
762 input power index parameter
770 control index parameter
771 control index parameter
772 control index parameter
800 coupling data
802 coupling data
802A coupling data.

The invention claimed is:

1. An accessory device for a communication system that is configured to be worn by a human, the accessory device comprising a memory, wherein the memory comprises first coupling data comprising a first index parameter and a second index parameter;

wherein the accessory device is configured to provide the first coupling data to a communication device of the communication system via an electrical conductor, to thereby allow the communication device to operate with the accessory device and/or to configure the accessory device; and wherein the first coupling data comprises a data structure having a first index position associated with the first index parameter, and wherein the first index parameter is a control index parameter for controlling an utilization of an I/O interface, a headset index parameter indicating a headset type, or an Aux index parameter indicating whether the accessory device has an auxiliary component.

2. The accessory device according to claim 1, wherein the memory comprises second coupling data, and wherein the accessory device is configured to output the second coupling data via the cable electrical conductor.

3. The accessory device according to claim 2, wherein the accessory device is configured to receive a write request from the communication device.

4. The accessory device according to claim 3, wherein the write request is associated with the second coupling data.

5. The accessory device according to claim 4, wherein the accessory device is configured to store the second coupling data in the memory after receiving the write request.

6. The accessory device according to claim 1, wherein the memory of the accessory device comprises header data.

7. The accessory device according to claim 1, wherein the accessory device is configured to communicatively couple between the communication device and another accessory device; and
wherein the accessory device is configured to obtain a secondary coupling data stored in the other accessory device, and determine the first coupling data based on the secondary coupling data.

8. An accessory device for a communication system, the accessory device comprising a memory, wherein the memory comprises first coupling data comprising a first index parameter and a second index parameter, and wherein the accessory device is configured to provide the first coupling data to a communication device;
wherein first coupling data has a data structure comprising a first index position and a second index position associated respectively with the first index parameter and the second index parameter, and wherein the first index parameter and the second index parameter of the first coupling data indicate respectively different attributes of the accessory device.

9. The accessory device of claim 8, wherein the accessory device is configured to provide the first coupling data to the communication device via an electrical conductor, wherein the first coupling data provided by the accessory device via the electrical conductor enables a coupling of the accessory device with the communication device, and wherein the coupling allows the communication device to operate with the accessory device and/or to configure the accessory device.

10. The accessory device of claim 8, wherein the first index parameter of the first coupling data comprises a control index parameter for controlling an utilization of an I/O interface.

11. The accessory device of claim 8, wherein the first index parameter of the first coupling data comprises a headset index parameter indicating a headset type.

12. The accessory device of claim 8, wherein the first index parameter of the first coupling data comprises an Aux index parameter indicating whether the accessory device has an auxiliary component.

13. The accessory device of claim 8, wherein the first index parameter of the first coupling data comprises a first audio index parameter indicating a first audio type or a first audio functionality, and wherein the second index parameter of the first coupling data comprises a second audio index parameter indicating a second audio type or a second audio functionality.

14. The accessory device of claim 8, wherein the first coupling data is accessible by a communication device in the communication system, and is configured to inform the communication device of the different attributes of the accessory deice via the first index parameter and the second index parameter.

15. A communication device, comprising:
a communication interface configured to communicate with an accessory device, wherein the communication device and the accessory device are configured to be worn by a human; and
a processor configured to obtain first coupling data from the accessory device via an electrical conductor, and operate with and/or configure the accessory device based on the first coupling data, the first coupling data comprising a first index parameter, wherein the coupling data has a data structure having a first index position associated with the first index parameter, and wherein the first index parameter is a control index parameter for controlling an utilization of an I/O interface, a headset index parameter indicating a headset type, or an Aux index parameter indicating whether the accessory device has an auxiliary component;
wherein the first coupling data obtained by the processor of the communication device from the accessory device via the electrical conductor enables the communication device to operate with the accessory device and/or to configure the accessory device.

16. The communication device of claim 15, wherein the processor is configured to create second coupling data based on the first coupling data obtained from the accessory device, the second coupling data having a value that is different from a value of the first coupling data.

17. A communication device, comprising:
a communication interface configured to communicate with an accessory device; and
a processor configured to obtain first coupling data from the accessory device, obtain accessory device configuration based on the first coupling data, and operate with and/or configure the accessory device according to the accessory device configuration;
wherein the first coupling data comprises a first index parameter and a second index parameter; and
wherein first coupling data has a data structure comprising a first index position and a second index position associated respectively with the first index parameter and the second index parameter, and wherein the first index parameter and the second index parameter of the first coupling data indicate respectively different attributes of the accessory device.

18. The communication device of claim 17, wherein the processor of the communication device is configured to obtain the first coupling data from the accessory device via an electrical conductor, and wherein the first coupling data obtained by the processor of the communication device from the accessory device via the electrical conductor enables a coupling of the accessory device with the communication device, and wherein the coupling allows the communication device to operate with the accessory device and/or to configure the accessory device.

19. The communication device of claim 17, wherein the first index parameter of the first coupling data comprises a control index parameter for controlling an utilization of an I/O interface.

20. The communication device of claim 17, wherein the first index parameter of the first coupling data comprises a headset index parameter indicating a headset type.

21. The communication device of claim 17, wherein the first index parameter of the first coupling data comprises an Aux index parameter indicating whether the accessory device has an auxiliary component.

22. The communication device of claim 17, wherein the first index parameter of the first coupling data comprises a first audio index parameter indicating a first audio type or a first audio functionality, and wherein the second index parameter of the first coupling data comprises a second audio index parameter indicating a second audio type or a second audio functionality.

23. The communication device of claim 17, wherein the communication device is configured to determine the different attributes of the accessory device by accessing the first index parameter and the second index parameter of the first coupling data.

24. A communication device, comprising:
a communication interface configured to communicate with an accessory device; and
a processor configured to obtain first coupling data from the accessory device via an electrical conductor, and operate with and/or configure the accessory device according to the first coupling data, the first coupling data indicating a configuration or a feature of the accessory device;

wherein the first coupling data obtained by the processor of the communication device from the accessory device via the electrical conductor enables the communication device to operate with the accessory device and/or to configure the accessory device; and wherein the communication device is configured to combine at least a part of the first coupling data from the accessory device with at least a part of a second coupling data from another accessory device to form a combined coupling data, and wherein the communication device is configured to store the combined coupling data, and to operate the accessory device and the other accessory device based on the combined coupling data, wherein the combined coupling data is a separate data item from the first coupling data and the second coupling data, and wherein the combined coupling data has a data structure with a first index position associated with that at least the part of the first coupling data, and a second index position associated with the at least the part of the second coupling data.

* * * * *